United States Patent [19]
Steiger et al.

[11] 3,995,136
[45] Nov. 30, 1976

[54] ENHANCED LASER BEAM COUPLING TO A PLASMA

[75] Inventors: Arno D. Steiger, Pleasanton; Cornelius H. Woods, Livermore, both of Calif.

[73] Assignee: The United States of America as represented by the United States Energy Research and Development Administration, Washington, D.C.

[22] Filed: Mar. 18, 1974

[21] Appl. No.: 452,164

[52] U.S. Cl............................. 219/121 LM; 176/1
[51] Int. Cl.$^2$........................................... G21B 1/00
[58] Field of Search................. 219/121 L, 121 LM; 176/1

[56] References Cited
UNITED STATES PATENTS

| | | | |
|---|---|---|---|
| 3,257,283 | 6/1966 | Hamberger | 176/1 |
| 3,378,446 | 4/1968 | Whittlesey | 176/1 |
| 3,624,239 | 11/1971 | Fraas | 176/1 |
| 3,652,393 | 3/1972 | Kaiser et al. | 176/1 |
| 3,723,246 | 3/1973 | Lubin | 219/121 LM |
| 3,779,864 | 12/1973 | Kaw et al. | 176/1 |

OTHER PUBLICATIONS

J. M. Dawson, Abstract of "Anomalous Absorption of Radiation by Plasmas", 1973 Symposium on Plasma Heating Injection (copies enclosed).

*Primary Examiner*—J. V. Truhe
*Assistant Examiner*—Clifford C. Shaw
*Attorney, Agent, or Firm*—John A. Horan; Roger S. Gaither; Clifton E. Clouse, Jr.

[57] ABSTRACT

Density perturbations are induced in a heated plasma by means of a pair of oppositely directed, polarized laser beams of the same frequency. The wavelength of the density perturbations is equal to one half the wavelength of the laser beams. A third laser beam is linearly polarized and directed at the perturbed plasma along a line that is perpendicular to the direction of the two opposed beams. The electric field of the third beam is oriented to lie in the plane containing the three beams. The frequency of the third beam is chosen to cause it to interact resonantly with the plasma density perturbations, thereby efficiently coupling the energy of the third beam to the plasma.

10 Claims, 2 Drawing Figures

ENHANCED LASER BEAM COUPLING TO A PLASMA

The invention disclosed herein was made under, or in, the course of Contract No. W-7405-ENG-48 with the United States Atomic Energy Commission.

BACKGROUND OF THE INVENTION

This invention relates to heating a plasma by means of anomalous absorption of a laser beam, and more particularly it relates to the control of plasma density perturbations to enhance the absorption of the laser beam.

The transfer of electromagnetic energy from a single laser beam to a target plasma is initiated by random ion density fluctuations that are naturally present in a plasma. Under the action of the electromagnetic wave field of the laser beam, the plasma electrons oscillate at the laser frequency within the plasma back and forth past the pre-existing natural ion density fluctuations. The period of this electron oscillation is short as compared with the characteristic time for substantial change in the ion density pattern. Together with the natural ion density fluctuations there exist comparable electron density fluctuations, the electrons tending to follow the ion density fluctuations. Concomitant with the electron oscillations, electron density waves known as electron Langmuir waves (and certain other types of density variations) are directly generated. Electron Langmuir waves are undulations of the particle density of electrons in the plasma, which pattern of electron density moves through the plasma with a characteristic phase velocity depending on the wavelength of the undulations and the electron temperature, and which is accompanied by a longitudinal electric wavefield whose frequency is of the order of the electron plasma frequency $$\omega_e = \sqrt{\frac{4\pi e^2 n_e}{m_e}}$$

where $e$, $n_e$ and $m_e$ denote respectively the electron charge, the electron density and the electron rest mass.

Although the initial ion density fluctuations may be relatively small compared with the average ion density, there exists electrostatic coupling between the ion density fluctuations and the driven electron density waves which causes immediate growth, called parametric instability, in the amplitude of the ion density fluctuations as well as the associated electron Langmuir waves. During this growth in amplitude, energy transfer occurs from the laser beam to these plasma density waves. When the density perturbations associated with these waves become comparable with the averge ion density, the energy associated with the waves at that time is converted by turbulent processes into thermal energy in the plasma. The corresponding attenuation of the laser beam is known as anomalous absorption (as opposed to collisional absorption).

A persistent problem in heating a plasma by anomalous absorption is the generation of electron Langmuir waves having substantially larger phase velocities than the electron thermal velocity. The electric field of such Langmuir waves does not readily couple to plasma electrons which are near the thermal velocity and for this reason they are ineffectual in heating the plasma. Instead, the high-velocity waves act randomly to accelerate some of the electrons to superthermal velocities. This problem arises because the wave number spectrum of the typical ion density fluctuations extends downward to such small wavenumbers that the corresponding phase velocities of the electron Langmuir waves may considerably exceed the electron thermal velocity.

SUMMARY OF THE INVENTION

In brief, the invention is an improved method for efficiently coupling the energy of a laser beam to a plasma to rapidly and uniformly raise the plasma temperature and includes the steps of creating a warm plasma, directing first and second laser beams of similar polarization and of the same frequency at the plasma, the polarization of the beams being either linear, circular, or elliptical. In the case of linearly polarized beams the electric fields are made coplanar; in the case of circularly polarized beams the electric fields are of opposite helicities; and in the case of elliptically polarized beams the electric fields have congruent illipses of polarization and opposite senses of rotation. The frequencies of the beams are selected to be equal so as to induce in the plasma a substantial ion density perturbation that is one half the wavelength of the laser beams. A density perturbation is defined herein to be a density variation of selected wavelength superimposed on the pre-existing natural density fluctuations. The ion density perturbation which is induced in the plasma in this way grows rapidly in amplitude ahead of the pre-existing natural ion density fluctuations, thereby causing the electron Langmuir waves that are associated with the natural ion density fluctuations, which are of low amplitude, to interact minimally with the laser beam and therefore not to participate substantially in the transfer of energy from the laser beam to the plasma. In addition to the oppositely directed first and second laser beams of equal frequency which induce an ion density perturbation in the plasma that is one half the wavelength of the laser beams, a third laser beam may be directed at the plasma and made to interact with the plasma to efficiently transfer energy from the third beam to the plasma. This may be done by linearly polarizing the third beam to have its electric field lying in the plane containing the three beams. Under these conditions the frequency and amplitude of the third beam may be selected to cause maximum interaction between the Langmuir waves associated with the induced ion density perturbation and the third beam to thereby cause anomalous absorption of the third beam into the plasma.

It is an object of the invention to efficiently heat a plasma be means of a laser beam.

Another object is to heat a plasma to its fusion temperature.

Another object is to induce and control ion density variations in a warm plasma to interact with the energy of a laser beam to rapidly and efficiently heat the plasma to its fusion temperature.

Another object is to control the instabilities of a plamsa to enable a laser to evenly heat the plasma to its fusion temperature.

Another object is to so control the initial ion density fluctuations in a plasma that is being heated that the wave enegy of the electron Langmuir waves is effectively converted into thermal energy of the plasma.

Another object is to avoid the occurrence of superthermal electrons in heating a plasma.

Other objects and advantgeous features of the invention will be apparent in a description of a specific embodiment thereof, given by way of example only, to enable one skilled in the art to readily practice the invention, and described hereinafter with reference to the accompanying drawings.

DESCRIPTION OF AN ENBODIMENT

Figure 1:
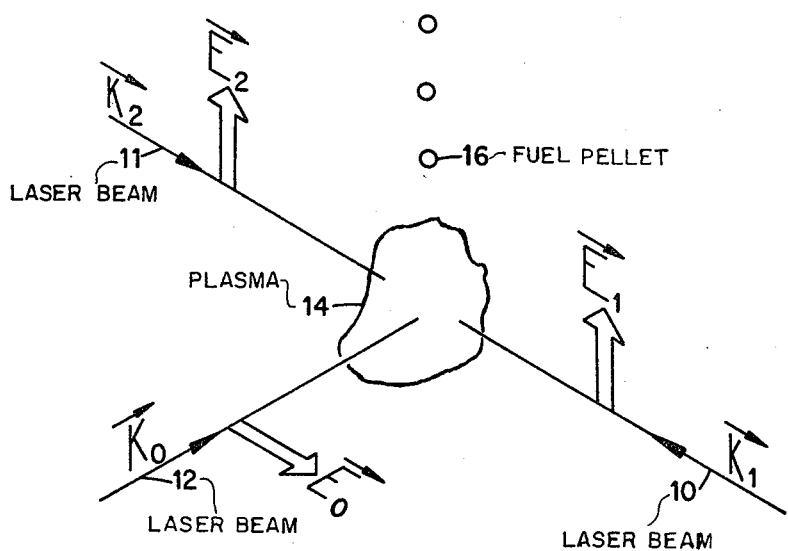
FIG. 1 is a diagram showing the direction and polarization of three laser beams used to supply energy to a plasma to raise the temperature of the plasma to the level at which it will undergo nuclear fusion, according to the invention.
Figure 2:
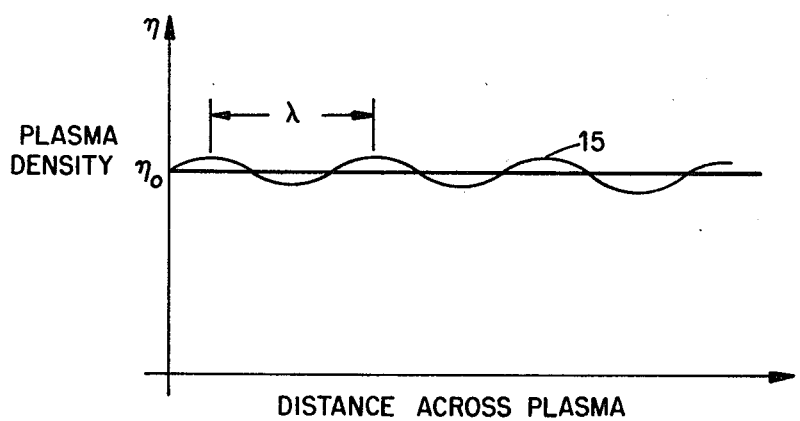
FIG. 2 is a graph representing the spatial periodicity of a density perturbation that is generated in the plasma of FIG. 1 by two oppositely directed laser beams of FIG. 1 to enhance the transfer of energy of the third beam to the plasma.

Referring to the drawing there are shown in FIG. 1 three laser beams 10, 11 and 12 directed at a warm plasma 14. The three beams 10, 11 and 12 have wave vectors $\vec{k_1}$, $\vec{k_2}$ and $\vec{k_o}$ respectively and are directed at a common point and lie in a common plane. The beams 10 and 11 are of the same frequency, coaxial and oppositely directed, while the beam 12 is perpendicular to the beams 10 and 11 and of a lower frequency. The beam 12 is linearly polarized and the beams 10 and 11 are also indicated for illustrative purposes as being linearly polarized, but they may be either circularly or elliptically polarized. The electric fields of the beams 10, 11 and 12 may be represnted by electric field vectors $\vec{E_1}$, $\vec{E_2}$ and $\vec{E_3}$, respectively. The electric fields of the beams 10 and 11 are coplanar and in the same direction, while the electric field of the beam 12 lies in a plane defined by the three beams 10, 11 and 12 and is therefore in a direction that is parallel to the direction of the beams 10 and 11. With this arrangement, an ion density perturbation 15 is produced in the plasma 14. The perturbation 15 is spatially periodic and varies in the direction of the beams 10 and 11 across the plasma 14 with a wavelength λ(FIG. 2) that is one half the wavelength of the beams 10 and 11. The electric field of the third beam 12 induces electron Langmuir waves in the plasma which have a wavelength equal to one half the wavelength of the beams 10 and 11, and which propagate along the direction of these beams. The frequency of the beams 10 and 11 is so chosen that the phase velocity of the driven electron Langmuir waves is comparable with the thermal velocity of the plasma electrons. Through electrostatic interaction between the ion density perturbation and the induced electron Langmuir waves the ion density perturbation grows in amplitude to the point that the perturbation dominates the density spectrum of the plasma. If the beams 10 and 11 are adiabatically switched on prior to the application of the beam 12, the induced ion density perturbation is non-oscillatory. However, if the beams 10 and 11 are switched on during a period that is short as compared with one ion acoustic period, the induced ion density perturbation will oscillate. In practice these two types of induced ion density perturbations are likely to be present simultaneously.

The frequency and amplitude of the beam 12 may be selected mathematically and/or empirically to cause anomalous absorption of the beam 12 into the plasma for efficient transfer of energy from the beam to the plasma. The selection of the frequency of the beam 12 should take into account the existence of inhomogeneities of the plasma density.

The warm plasma 14 may be created, for example, by injecting a solid thermonuclear fuel pellet 16, such as a pellet that is a mixture of frozen deuterium and tritium, into the intersection of the paths of the beams 10, 11 and 12. Heating of the plasma may conveniently be accomplished by the use of Nyodymium glass lasers at a frequency of $1.78 \times 10^{15}$ Hz to produce the beams 10 and 11, and a $CO_2$ laser at a frequency of $1.78 \times 10^{14}$ Hz to produce the beam 12, the Nyodymium lasers having a beam intensity of $10^{14}$ to $10^{15}$ W-cm$^{-2}$ and the $CO_2$ laser having a beam intensity of $10^{13}$ to $10^{14}$ W-cm$^{-2}$ for heating a plasma derived from deuterium.

The invention may also find use in applications other than nuclear fusion. In some applications it may be found desirable to make the beams 10 and 11 nonparallel. In such a case the initial ion density perturbations induced by the beams 10 and 11 will be somewhat diminished depending on the degree of nonalignment of the beams, but not ineffectual, and it will be found, nevertheless, advantageous to practice the invention in these instances.

For a more theoretical discussion of the inventions, reference is made to USAEC technical report No. UCRL-74721, A.D. Steiger and C. H. Woods, *Control of Ion Density Correlations in Laser Heated Plasma*, Lawrence Livermore Laboratory, University of California, Livermore, California, April 1973.

While an embodiment of the invention has been shown and described, further embodiments or combinations of those described herein will be apparent to those skilled in the art without departing from the spirit of the invention.

What we claim is:

1. A method for efficiently coupling the energy of a laser beam to a plasma by anomalous absorption to rapidly and uniformly raise the plasma temperature, indlucing the steps of:
    creating a warm plasma;
    directing first and second laser beams of similar polarization and of the same frequency at said plasma, the frequency of said first and second beams being selected to induce a substantial stationary ion density perturbation in said plasma that is one-half the wavelength of the frequency of said laser beams; and
    directing a third laser beam at said plasma, said third beam being linearly polarized and oriented to have its electric field lying in the plane defined by said three beams to cause interaction between Langmuir waves associated with said induced ion density perturbation and said third beam to thereby effect anomalous absorption of said third beam to thereby effect anomalous absorption of said third beam into said plasma.

2. The method of claim 1 wherein the intensity of said first and second beams is equal and the intensity of said third laser beam is on the order of 1/10 the intensity of said first and second laser beams.

3. The method of claim 2 wherein the intensity of said first and second beams is on the order of $10^{14}$ to $10^{15}$ W-cm$^{-2}$ and the intensity of said third beam is on the order of $10^{13}$ to $10^{14}$ W-cm$^{-2}$.

4. The method of claim 3 wherein said plasma is derived from deuterium.

5. The method of claim 1 wherein the step of creating a warm plasma includes the injection of thermonuclear fuel at the point of intersection of said laser beams.

6. The method of claim 1 wherein said first and second lasers are Nyodymium glass lasers and said third laser is a $CO_2$ laser.

7. The method of claim 1 wherein the frequency of said first and second laser beams is adjusted to be $1.78 \times 10^{15}$ Hz and the frequency of said third laser beam is adjusted to be $1.78 \times 10^{14}$ Hz.

8. The method of claim 1 wherein said first and second beams are linearly polarized and have electric fields that are coplanar.

9. The method of claim 1 wherein said first and second beams are circularly polarized and have electric fields that are of opposite helicity.

10. The method of claim 1 wherein said first and second beams are elliptically polarized with congruent ellipses of polarization and have electric fields of opposite senses of rotation.

* * * * *